US007829483B2

(12) United States Patent
Lovasic et al.

(10) Patent No.: US 7,829,483 B2
(45) Date of Patent: *Nov. 9, 2010

(54) PIPD COMFORT FABRICS AND ARTICLED MADE THEREFROM

(75) Inventors: Susan L. Lovasic, Chester, VA (US); Reiyao Zhu, Midlothian, VA (US); Richard Young, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/085,247

(22) PCT Filed: Dec. 13, 2006

(86) PCT No.: PCT/US2006/061962

§ 371 (c)(1),
(2), (4) Date: May 19, 2008

(87) PCT Pub. No.: WO2007/070813

PCT Pub. Date: Jun. 21, 2007

(65) Prior Publication Data

US 2009/0247035 A1  Oct. 1, 2009

(51) Int. Cl.
*D03D 15/00* (2006.01)
(52) U.S. Cl. .................. 442/301; 442/414; 428/359; 428/364; 428/920; 428/921
(58) Field of Classification Search ............. 428/359, 428/364, 920, 921; 442/301, 414
See application file for complete search history.

*Primary Examiner*—Ula C Ruddock

(57) ABSTRACT

The invention concerns a fabric useful in apparel and garments comprising an intimate blend of staple fibers, the blend of fibers comprising 55 to 95 parts by weight of a polypyridobisimidazole fiber having an inherent viscosity of greater than 20 dl/g and a tensile modulus of greater than 120 GPa (820 gpd); and 5 to 45 parts by weight of a flexible fiber having a tensile modulus of less than 10 GPa (70 gpd).

20 Claims, No Drawings

PIPD COMFORT FABRICS AND ARTICLED MADE THEREFROM

FIELD OF THE INVENTION

The invention concerns fabrics made from an intimate staple fiber blend of high modulus, rigid-rod polypyridobisimidazole fibers and low modulus flexible fibers and articles made therefrom.

BACKGROUND OF THE INVENTION

Polypyridobisimidazole polymer is a rigid rod polymer. Fiber made from this polymer, one polymer composition of which is referred to as PIPD, known as the polymer used to make M5® fiber, is known to be useful in both cut and flame resistant protective apparel. Sec for example, PCT Application WO199902169 and WO2005002376. Rigid-rod polymer fibers having strong hydrogen bonds between polymer chains, e.g., polypyridobisimidazoles, have been described in U.S. Pat. No. 5,674,969 to Sikkema et al. An example of a polypyridobisimidazole includes poly(1,4-(2,5-dihydroxy)phenylene-2,6-pyrido[2,3-d:5,6-d']bisimidazole), which can be prepared by the condensation polymerization of tetraaminopyridine and 2,5-dihydroxyterephthalic acid in polyphosphoric acid. Sikkema describes that in making one- or two-dimensional objects, such as fibers, films, tapes, and the like, it is desired that polypyridobisimidazoles have a high molecular weight corresponding to a relative viscosity ("$V_{rel}$" or "$\eta_{rel}$") of at least about 3.5, preferably at least about 5, and more particularly equal to or higher than about 10, when measured at a polymer concentration of 0.25 g/dl in methane sulfonic acid at 25° C. Sikkema also discloses that very good fiber spinning results are obtained with poly[pyridobisimidazole-2,6-diyl(2,5-dihydroxy-p-phenylene)] having relative viscosities greater than about 12, and that relative viscosities of over 50 (corresponding to inherent viscosities greater than about 15.6 dl/g) can be achieved.

Thermal and flame retardant protective apparel has been used by firefighters, emergency response personnel, members of the military and racing personnel as well as industrial workers to save lives and reduce injury due to fires and other thermal events. While polypyridobisimidazole fiber has excellent fire resistant properties, superior in many respects to most other fibers, it also has a high modulus of elasticity. There is a concern that such high modulus fibers may create fabrics that reflect the fibers, meaning that these fabrics also have a high modulus or are relatively stiff and uncomfortable to wear. However, there is a desire to incorporate the superior fire resistance of polypyridobisimidazole fibers into fabrics so that additional lives may be saved. What is needed, therefore, is a fabric comprising polypyridobisimidazole that is both comfortable and still provides adequate fire protective performance.

SUMMARY OF THE INVENTION

In one aspect the invention concerns fabrics useful in apparel and garments comprising an intimate blend of polypyridobisimidazole fiber, having an inherent viscosity of greater than 20 dl/g and a tensile modulus of greater than 120 GPa (820 gpd), and flexible fiber having a tensile modulus of less than 10 GPa (70 gpd). In some embodiments, the blend comprises 55 to 95 parts by weight of a polypyridobisimidazole fiber having an inherent viscosity of greater than 20 dl/g and 5 to 45 parts by weight of a flexible fiber having a tensile modulus of less than 10 GPa (70 gpd). In certain embodiments, the fiber blend has 60 to 80 parts by weight of polypyridobisimidazole.

In some embodiments of the invention, the polypyridobisimidazole and flexible fibers are staple fibers.

In some embodiments of the invention the flexible fiber has a limiting oxygen index of greater than 24. In some embodiments of the invention, the flexible fiber is made from an aramid polymer or a polybibenzimidazole polymer. In some embodiments the flexible fiber includes a flame retardant chemical treatment. In some embodiments the flexible fiber is made from a thermoplastic polymer. In some embodiments the flexible fiber is a natural fiber.

The polypyridobisimidazole fiber may have an inherent viscosity of at least 20 dl/g. Certain fibers have an inherent viscosity of at least 25 dl/g or at least 28 dl/g. In some embodiments, the polypyridobisimidazole fiber is a polypyridobisimidazole fiber. One suitable polypyridimidazole fiber is poly[2,6<diimidazo[4,5-b:4,5-e]-pyridinylene-1,4(2,5-dihydroxy)phenylene) fiber.

Some fabrics of the invention are in the form of a woven/knitted fabric. Yet other fabrics are in the form of a nonwoven fabric.

The invention is also directed to protective articles and protective garments utilizing flame resistant fabrics of the instant invention.

In yet another aspect, the invention concerns a method of producing a flame resistant fabric comprising weaving fibers that are 55 to 95 parts by weight of a polypyridobisimidazole fiber having an inherent viscosity of greater than 20 dl/g and a tensile modulus of greater than 120 GPa (820 gpd); and 5 to 45 parts by weight of a flexible fiber having a tensile modulus of less than 10 GPa (70 gpd). Some preferred embodiments of this invention concern the method of producing a flame resistant fabric wherein the polypyridobisimidazole fiber is present in an amount of 60 to 80 parts by weight.

DETAILED DESCRIPTION OF ILLUSTRATIVE EMBODIMENTS

The present invention may be understood more readily by reference to the following detailed description of illustrative and preferred embodiments that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

This invention relates to a fabric useful in apparel and garments comprising an intimate blend of staple fibers, the blend of fibers comprising 55 to 95 parts by weight of a polypyridobisimidazole fiber having an inherent viscosity of greater than 20 dl/g and a tensile modulus of greater than 120 GPa (820 gpd) and 5 to 45 parts by weight of a flexible fiber having a tensile modulus of less than 10 GPa (70 gpd). In some preferred embodiments the fabric comprises 60 to 80 parts by weight of polypyridobisimidazole fiber.

For purposes herein, the term "fiber" is defined as a relatively flexible, macroscopically homogeneous body having a high ratio of length to width across its cross-sectional area perpendicular to its length. The fiber cross section can be any shape, but is typically round. Herein, the term "filament" or "continuous filament" is used interchangeably with the term "fiber."

As used herein, the term "staple fibers" refers to fibers that are cut to a desired length or fibers that occur naturally with or naturally have a low ratio of length to width across its cross-sectional area perpendicular to its length when compared with filaments. Length can vary from about 0.1 inch to several feet. In some embodiments, the length is from 0.1 inch to about 8 inches. Man made staple fibers are cut to a length suitable for processing on cotton, woolen, or worsted yarn spinning equipment.

The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a length of 1 to 30 centimeters. Staple fibers made by short staple processes result in a fiber length of 1 to 6 centimeters.

The staple fibers can be made by any process. The staple fibers can formed by stretch breaking continuous fibers resulting in staple fibers with deformed sections that act as crimps. The staple fibers can be cut from continuous straight fibers using a rotary cutter or a guillotine cutter resulting in straight (i.e., non crimped) staple fiber, or additionally cut from crimped continuous fibers having a saw tooth shaped crimp along the length of the staple fiber, with a crimp (or repeating bend) frequency of no more than 8 crimps per centimeter.

Stretch broken staple fibers can be made by breaking a tow or a bundle of continuous filaments during a stretch break operation having one or more break zones that are a pre-scribed distance creating a random variable mass of fibers having an average cut length controlled by break zone adjustment.

Staple fibers of this invention can be converted into yarns using traditional long and short staple ring spinning processes which are well known in the art. For short staple, cotton system spinning fiber lengths from ¾ inch to 2¼ inch (i.e., 1.9 to 5.7 cm.) are typically used. For long staple, worsted or woolen system spinning, fibers up to 6½ inches (i.e., 16.5 cm) are typically used. However, this is not intended to be limiting to ring spinning because the yarns may also be spun using air jet spinning, open end spinning, and many other types of spinning which converts staple fiber into useable yarns.

The stretch broken staple fibers typically have length of up to 7 inches (i.e., 17.8 cm) long and can be 15 made using traditional stretch-broken tow to top staple processes. Staple fibers having maximum lengths of up to around 20 inches (i.e., 51 cm) are possible through processes as described for example in PCT Patent Application No. WO 0077283. Yarns are so made by consolidated fibers into spun yarn using filament entanglement with air jets having a tenacity in the range of 3 to 7 grams per decitex. These yarns may have secondary twist, that is, they may be twisted after formation to impart more tenacity to the yarn, in which case the tenacity can be in the 10 to 18 grams per denier (i.e., 9 to 17 grams per dtex) range. Stretch broken staple fibers normally do not require crimp because the process imparts a degree of crimp into the fiber.

The term continuous filament refers to a flexible fiber having relatively small-diameter and whose length is longer than those indicated for staple fibers. Continuous filament fibers can be converted to multifilament yarns by processes well known to those skilled in the art.

Fabrics of this invention can take on numerous configurations, including, but not limited to, knitted or woven fabrics or non-woven structures. Such fabric configurations are well known to those skilled in the art.

By "non-woven" fabric is meant a network of fibers, including unidirectional (if contained within a matrix resin), felt, fiber batts, and the like.

By "woven" fabric is meant a fabric woven using any fabric weave, such as plain weave, crowfoot weave, basket weave, satin weave, twill weave, and the like. Plain and twill weaves are believed to be the most common weaves used in the trade.

The instant invention utilizes polypyridobisimidazole fiber. This fiber is a rigid rod polymer that is of high strength. The polypyridobisimidazole fiber has an inherent viscosity of at least 20 dl/g or at least 25 dl/g or at least 28 dl/g. Such fibers include PIPD fiber (also known as M5® fiber and fiber made from poly[2,6-diimidazo[4,5-b:4,5-e]-pyridinylene-1,4(2,5-dihydroxy)phenylene). PIPD fiber is based on the structure:

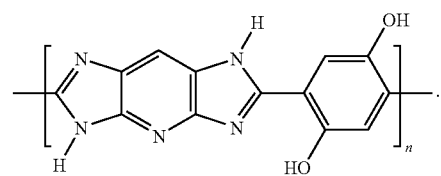

Polypyridobisimidazole fiber can be distinguished from the well known commercially available PBI fiber or polybenzimidazole fiber in that that polybenzimidazole fiber is a polybibenzimidazole. Polybibenzimidazole fiber is not a rigid rod polymer and has low fiber strength and low tensile modulus when compared to polypyridobisimidazoles.

PIPD fibers have been reported to have the potential to have an average modulus of about 310 GPa (2100 grams/denier) and an average tenacities of up to about 5.8 Gpa (39.6 grams/denier). These fibers have been described by Brew, et al., *Composites Science and Technology* 1999, 59, 1109; Van der Jagt and Beukers, *Polymer* 1999, 40, 1035; Sikkema, *Polymer* 1998, 39, 5981; Klop and Lammers, *Polymer,* 1998, 39, 5987; Hageman, et al., *Polymer* 1999, 40, 1313.

The fabrics of this invention also contain at least one flexible fiber. By "flexible" it is meant the fiber has a significantly lower tensile modulus than the high inherent viscosity polypyridobisimidazole fiber that is also present. In particular, the flexible fibers useful in embodiments of this invention have a tensile modulus of less than 10 GPa (70 gpd). Such flexible fibers can include one or more of fibers made from thermoplastic polymer such as polyester fibers, or natural fibers, rayon fibers, cellulose fibers, halogen-containing fibers, flame retardant fibers, fibers derived from cellulose, or mixtures of these fibers.

In some embodiments of this invention, the flexible fiber has a limiting oxygen index of greater than 24. Such fibers can be a fiber having a flame retardant treatment, a fiber made from inherently flame retardant material, or may be a natural fiber having high flame retardancy. Such fibers would include FR rayon, FR polyester, FR PVA (polyvinylalcohol), PVC (polyvinylchloride), FR modacrylic and modacrylic. As presented herein, limiting oxygen index values are determined using ASTM D2863-00.

In other embodiments of this invention, the flexible fiber can be made from polymer having aromatic groups but a lower tensile modulus. Representative polymers include some nylon, aromatic polyester or aramid polymers, particularly meta-aramid polymers that typically have a tensile modulus of 10 GPa (70 gpd) or less, and fibers made from polybibenzimidazole polymer, known in the art as PBI fibers, which have at tensile modulus of about 7 GPa (45 gpd).

Natural cellulose fibers are typically derived from paper pulp from trees or other vegetative sources. In addition to natural cellulose fibers, man made fibers derived from cellulose are useful in the instant invention. Useful fibers derived from cellulose include cellulose acetate and cellulose triacetate.

Rayon is a manufactured fiber composed of regenerated cellulose, in which substituents have replaced not more than 15% of the hydrogens of the hydroxyl groups.

Polyester is a synthetic fiber formed from a substance that is any long-chain synthetic polymer composed of at least 85% by weight of an ester of an aromatic dicarboxylic acid. Suitable aromatic caraboxylic acids include but not restricted to substituted terephthalic units, $p(-R-O-CO-C_6H_4-CO-O-)_x$ and parasubstituted hydroxy-benzoate units, $p(-R-O-CO-C_6H_4-O-)_x$. One common polyester fiber is poly (ethylene terephthalate) (also known as "PET").

Halogen-containing polymer include homopolymers of halogen-containing monomers. These monomers include vinyl chloride, vinylidene chloride, vinyl bromide and vinylidene bromide. Other halogen-containing polymers include copolymers of two or more of these monomers. In addition, this class of fibers includes those made from a homopolymer of a halogen-containing vinyl monomer or a halogen-containing vinylidene monomer (such as acrylonitrile-vinyl chloride, acrylonitrile-vinylidene chloride, acrylonitrile-vinyl bromide, acrylonitrile-vinyl chloride-vinylidene chloride, acrylonitrile-vinyl chloride-vinyl bromide and acrylonitrile-vinylidene chloride-vinyl bromide). Other compositions include copolymers of at least one halogen-containing vinyl monomer and halogen-containing vinylidene monomers and acrylonitrile; a homopolymer of a halogen-containing vinyl monomer or a halogen-containing vinylidene monomer (such as vinyl chloride, vinylidene chloride, vinyl bromide or vinylidene bromide), or a copolymer of at least one of these halogen-containing vinyl monomers and halogen-containing vinylidene monomers, acrylonitrile and a vinyl monomer or a vinylidene monomer copolymerizable therewith; and a polymer obtained by addition-polymerizing an acrylonitrile homopolymer with a halogen-containing compound; and a halogen-containing polyester. Halogen-containing fibers include polytetrafluoroethylene, a perfluoro copolymer of tetrafluoroethylene or polytetrafluoroethylene fibers coated with perfluoro copolymers of tetrafluoroethylene.

Flame retardant fibers and their preparation are well known to those skilled in the art. In some preferred embodiments of the present invention, inherently inflammable fibers that have been treated so that they have a limiting oxygen index (LOI) of greater than 24 are used. These materials can be treated by any of the available means to produce such fibers.

Suitable flame retardants include a halogen-based or phosphorus-based flame retardant, antimony trioxide, antimony pentoxide, sodium antimonate, metallic antimony, antimony trichloride, antimony pentachloride, antimony trisulfide, antimony pentasulfide, zinc borate, barium metaborate or zirconium oxide. They may be used in conventional amounts.

One method of making rigid rod polypyridoimidazole polymer is disclosed in detail in U.S. Pat. No. 5,674,969 to Sikkema et al. Polypyridoimidazole polymer may be made by reacting a mix of dry ingredients with a polyphosphoric acid (PPA) solution. The dry ingredients may comprise pyridobisimidazole-forming monomers and metal powders. The polypyridobisimidazole polymer used to make the rigid rod fibers used in the fabrics of this invention should have at least 25 and preferably at least 100 repetitive units. The polypyridobisimidazole fiber useful in this invention has an inherent viscosity of at least 20 dl/g. Certain fibers have an inherent viscosity of at least 25 dl/g or at least 28 dl/g.

For the purposes of this invention, the relative molecular weights of the polypyridoimidazole polymers are suitably characterized by diluting the polymer products with a suitable solvent, such as methane sulfonic acid, to a polymer concentration of 0.05 g/dl, and measuring one or more dilute solution viscosity values at 30° C. Molecular weight development of polypyridoimidazole polymers of the present invention is suitably monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh} = \ln(V_{rel})/C,$$

where ln is the natural logarithm function and C is the concentration of the polymer solution. $V_{rel}$ is a unitless ratio of the polymer solution viscosity to that of the solvent free of polymer, thus $V_{inh}$ is expressed in units of inverse concentration, typically as deciliters per gram ("dl/g"). Accordingly, in certain aspects of the present invention the polypyridoimidazole polymers are produced that are characterized as providing a polymer solution having an inherent viscosity of at least about 20 dl/g at 30° C. at a polymer concentration of 0.05 g/dl in methane sulfonic acid. Because the higher molecular weight polymers that result from the invention disclosed herein give rise to viscous polymer solutions, a concentration of about 0.05 g/dl polymer in methane sulfonic acid is useful for measuring inherent viscosities in a reasonable amount of time.

Exemplary pyridobisimidazole-forming monomers useful in this invention include 2,3,5,6-tetraaminopyridine and a variety of acids, including terephthalic acid, bis-(4-benzoic acid), oxy-bis-(4-benzoic acid), 2,5-dihydroxyterephthalic acid, isophthalic acid, 2,5-pyridodicarboxylic acid, 2,6-napthalenedicarboxylic acid, 2,6-quinolinedicarboxylic acid, or any combination thereof. Preferably, the pyridobisimidazole forming monomers include 2,3,5,6-tetraaminopyridine and 2,5-dihydroxyterephthalic acid. In certain embodiments, it is preferred that that the pyridoimidazole-forming monomers are phosphorylated. Preferably, phosphorylated pyridoimidazole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The pyridobisimidazole-forming monomers and metal powders are mixed and then the mixture is reacted with polyphosphoric acid to form a polypyridoimidazole polymer solution. Additional polyphosphoric acid can be added to the polymer solution if desired. The polymer solution is typically extruded or spun through a die or spinneret to prepare or spin the filament.

This invention also relates to a method of producing a fabric comprising weaving staple fiber yarns comprising an intimate blend of 55 to 95 parts by weight of a polypyridobisimidazole fiber having an inherent viscosity of greater than 20 dl/g and a tensile modulus of greater than 120 GPa (820 gpd); and 5 to 45 parts by weight of a flexible fiber having a tensile modulus of less than 10 GPa (70 gpd). In some embodiments, the polypyridobisimidazole fiber is present at 60 to 80 parts by weight. In some preferred embodiments the polypyridobisimidazole fiber is poly[2,6-diimidazo[4,5-b:4,5-e]-pyridinylene-1,4(2,5-dihydroxy)phenylene) fiber.

Another embodiment of this invention is a method of producing a fabric comprising forming from an intimate staple fiber blend of 55 to 95 parts by weight of a polypyridobisimidazole fiber having an inherent viscosity of greater than 20 dl/g and a tensile modulus of greater than 120 GPa (820 gpd); and 5 to 45 parts by weight of a flexible fiber having a tensile modulus of less than 10 GPa (70 gpd). In some embodiments, the polypyridobisimidazole fiber is present at 60 to 80 parts by weight. In some preferred embodiments the polypyridobisimidazole fiber is poly[2,6-diimidazo[4,5-b:4,5-e]-pyridinylene-1,4(2,5-dihydroxy)phenylene) fiber.

By "intimate blend" it is meant the high modulus staple fibers and the low modulus staple fibers form a relatively uniform mixture of the fibers. If desired, other staple fibers can be combined in this relatively uniform mixture of staple fibers. The blending can be achieved by any number of ways known in the art, including processes that creel a number of bobbins of continuous filaments and concurrently cut the two or more types of filaments to form a blend of cut staple fibers; or processes that involve opening bales of different staple fibers and then opening and blending the various fibers in openers, blenders, and cards; or processes that form slivers of various staple fibers which are then further processed to form a mixture, such as in a card to form a sliver of a mixture of fibers. Other processes of making an intimate fiber blend are possible as long as the various types of different fibers are relatively uniformly distributed throughout the blend. If yarns are formed from the blend, the yarns have a relatively uniform mixture of the staple fibers also. Generally, in most preferred embodiments the individual staple fibers are opened or separated to a degree that is normal in fiber processing to make a useful fabric, such that fiber knots or slubs and other major defects due to poor opening of the staple fibers are not present in an amount that detract from the final fabric quality.

The fabrics of this invention are useful in and can be incorporated into articles, including protective articles and garments, especially garments known as turnout gear which are useful for firefighters, and garments also have use in industrial applications where workers may be exposed to abrasive and mechanically harsh environments where fire and flame protection is needed. The garments may include coats, coveralls, jackets, pants, sleeves, aprons, and other types of apparel where protection against fire, flame, and heat is needed.

Test Methods

Thermal Protective Performance Test (TPP)

The predicted protective performance of a fabric in heat and flame is measured using the "Thermal Protective Performance Test" NFPA 2112 (referred to as "TPP"). A flame is directed at a section of fabric mounted in a horizontal position at a specified heat flux (typically 84 kW/m$^2$). The test measures the transmitted heat energy from the source through the specimen using a copper slug calorimeter with no space between the fabric and heat sensor. The test endpoint is characterized by the time required to attain a predicted second-degree skin burn injury using a simplified model developed by Stoll & Chianta, "Transactions New York Academy Science", 1971, 33 p 649. The value assigned to a specimen in this test, denoted as the TPP value, is the total heat energy required to attain the endpoint, or the direct heat source exposure time to the predicted burn injury multiplied by the incident heat flux. Higher TPP values denote better insulation performance.

Abrasion Resistance Test

Abrasion resistance is determined using ASTM method D3884-80, with a H-18 wheel, 500 gms load on a Taber abrasion resistance available from Teledyne Taber, 455 Bryant St., North Tonawanda, N.Y. 14120. Taber abrasion resistance is reported as cycles to failure.

Grab Strength Test

The grab strength measurement, which is a determination of breaking strength and elongation of fabric or other sheet materials, is based on ASTM D5034. A 100-mm (4.0 in.) wide specimen is mounted centrally in clamps of a tensile testing machine and a force applied until the specimen breaks. Values for the breaking force and the elongation of the test w specimen are obtained from machine scales or a computer interfaced with testing machine.

Tear Strength Test

The tear strength measurement (also referred to as "TRAP Tear") is based on ASTM D 5587-96. This test method covers the measurement of the tear strength of textile fabrics by the trapezoid procedure using a recording constant-rate-of-extension-type (CRE) tensile testing machine. Tear strength, as measured in this test method, requires that the tear be initiated before testing. The specimen is slit at the center of the smallest base of the trapezoid to start the tear. The nonparallel sides of the marked trapezoid are clamped in parallel jaws of a tensile testing machine. The separation of the jaws is increased continuously to apply a force to propagate the tear across the specimen. At the same time, the force developed is recorded. The force to continue the tear is calculated from autographic chart recorders or microprocessor data collection systems. Two calculations for trapezoid tearing strength are provided: the single-peak force and the average of five highest peak forces. For the examples of this patent, the single-peak force is used.

Vertical Flame Test

The vertical flame test is performed as described in ASTM D6143 According to the test, a section of fabric was mounted vertically and a specified flame was applied to its lower edge for twelve seconds. The response of the fabric to the flame exposure was recorded. The length of the fabric that was burned or charred was measured. Times for afterflame (i.e., the continued burning of the fabric section after removing the test flame) and afterglow (characterized by smoldering of the fabric section after removing the test flame) were also measured. Additionally, observations regarding melting and dripping from the fabric section were recorded. Pass/fail specifications based on this method are established for industrial worker clothing, firefighter turnout gear and flame retardant station wear, and military clothing. A fabric can be considered fire resistant if it has a char length of less than six inches after a twelve second exposure to a flame, which is a standard industry conception of fire resistant.

Arc Thermal Performance Test

The arc resistance of fabrics of this invention is determined in accordance with ASTM F-1959-99 "Standard Test Method for Determining the Arc Thermal Performance Value of Materials for Clothing". The test method determines the incident energy which would predict a second degree burn injury when the materials) is exposed to heat energy from an arc. During this procedure, the amount of heat energy transferred by the material(s) is measured during and after exposure to an arc. The heat flux of the exposure and that transferred by the test specimen(s) are both measured with calorimeters. The rate at which the temperature of the calorimeters increases is a direct measure of the heat energy received. Heat transfer data is used to predict the onset of second degree burn using the Stoll curve. Then, arc rating is determined.

The invention is illustrated by, but is not intended to be limited by the following examples.

EXAMPLE 1

A thermally protective and durable fabric is prepared having in both the warp and fill ring spun yarns of intimate blends of FR rayon staple fiber and polypyridobisimidazole staple fiber. The FR rayon is a cellulosic fiber containing phosphorus compounds available from Lenzing Fibers of Austria under the trademark Lenzing FR®, and having a tensile modulus of less than 10 GPa (70 gpd), believed to be about 0.5 gpd. The polypyridobisimidazole staple fiber is made from PIPD polymer, is marketed by Magellan Systems International under the trademark M5® fiber, and has a tensile modulus of about 1400 gpd.

A picker blend sliver of 60 wt. % of polypyridobisimidazole and 40 wt % of FR rayon fiber is prepared and processed by conventional cotton system equipment and is then spun into a spun staple yarn having a twist multiplier of 4.0 and a single yarn size of about 21 tex (28 cotton count) using a ring spinning frame. Two single yarns are then plied on a plying machine to make a two-ply yarn. Using a similar process and the same twist and blend ratio, a 24 tex (24 cotton count) yarn is made for use as a fill yarn. As before, two of these single yarns are then plied to form a two-ply yarn.

The FR rayon/polypyridobisimidazole blend yarns are then used as the warp and fill yarns and are woven into a fabric on a shuttle loom, making a greige fabric having a 2×1 twill weave and a construction of 26 ends×17 picks per cm (72 ends×52 picks per inch), and a basis weight of about 200 g/m$^2$ (6 oz/yd$^2$). The greige twill fabric prepared as described above is then scoured in hot water and is dried under low tension. The scoured fabric is then jet dyed, using basic dye. The finished fabric has a basis weight of about 215 g/m$^2$ (6.5 oz/yd$^2$) and has adequate fire retardant properties to meet the requirements of NFPA 2112 performance in vertical flame.

The finished fabric is then made into protective articles and garment by cutting the fabric into fabric shapes per a pattern and sewing the shapes together to form a protective coverall for use as protective apparel in industry. Likewise, the fabric is cut into fabric shapes and the shapes sewn together to form a protective apparel combination comprising a protective shirt and a pair of protective pants. If desired, the fabric is cut and sewn to form other protective apparel components such as hoods, sleeves, and aprons.

EXAMPLE 2

A thermally protective and durable fabric is prepared having in both the warp and fill ring spun yarns of intimate blends of modacrylic staple fiber, polypyridobisimidazole staple fiber, and antistatic staple fiber. The modacrylic staple fiber is made from an acrylonitrile/polyvinylidene chloride co-polymer, is known under the trademark Protex® C (available from Kaneka), and has a tensile modulus of about 40 gpd. The polypyridobisimidazole fiber is made from PIPD polymer, is marketed by Magellan Systems International under the trademark M5® fiber, and has a tensile modulus of about 1400 gpd.

The antistatic staple fiber has a nylon sheath and carbon core and is known as P-140 nylon fiber (available from Invista).

A picker blend sliver of 70 wt. % polypyridobisimidazole, 27% of modacrylic, and 3 wt. % of antistatic fiber is prepared and processed by the conventional cotton system equipment and is spun into a spun staple yarn having a twist multiplier of 4.0 and a single yarn size of about 21 tex (28 cotton count) using a ring spinning frame. Two single yarns are then plied on a plying machine to make a two-ply yarn. Using a similar process and the same twist and blend ratio, a 24 tex (24 cotton count) yarn is made for use as a fill yarn. As before, two of these single yarns are plied to form a two-ply yarn.

The modacrylic/polypyridobisimidazole/antistatic yarns are then used as the warp and fill yarns and are woven into a fabric on a shuttle loom, making a greige fabric having a 2×1 twill weave and a construction of 26 ends×17 picks per cm (72 ends×52 picks per inch), and basis weight of about 200 g/m$^2$ (6 oz/yd$^2$). The greige twill fabric is then scoured in hot water and is dried under low tension. The scoured fabric is then jet dyed using basic dye. The finished fabric has a basis weight of about 215 g/m$^2$ (6.5 oz/yd$^2$) and has adequate fire retardant properties to meet the requirements of NFPA 2112 performance in vertical flame.

The finished fabric is then made into protective articles and garment by cutting the fabric into fabric shapes per a pattern and sewing the shapes together to form a protective coverall for use as protective apparel in industry. Likewise, the fabric is cut into fabric shapes and the shapes sewn together to form a protective apparel combination comprising a protective shirt and a pair of protective pants. If desired, the fabric is cut and sewn to form other protective apparel components such as hoods, sleeves, and aprons.

All patents and publications disclosed herein are incorporated by reference in their entirety.

What is claimed:

1. A fabric useful in apparel and garments comprising an intimate blend of staple fibers, the blend of fibers comprising:
   55 to 95 parts by weight of a polypyridobisimidazole fiber having an inherent viscosity of greater than 20 dl/g and a tensile modulus of greater than 120 GPa (820 gpd); and
   5 to 45 parts by weight of a flexible fiber having a tensile modulus of less than 10 GPa (70 gpd).

2. The fabric of claim 1 comprising 60 to 80 parts by weight of polypyridobisimidazole fiber.

3. The fabric of claim 1 wherein the flexible fiber has a limiting oxygen index of greater than 24.

4. The fabric of claim 3 wherein the flexible fiber is made from an aramid polymer or a polybibenzimidazole polymer.

5. A protective article or garment comprising the flame resistant fabric of claim 3.

6. The fabric of claim 1 wherein the flexible fiber includes a flame retardant chemical treatment.

7. The fabric of claim 6 wherein the flexible fiber is made from a thermoplastic polymer.

8. The fabric of claim 6 wherein the flexible fiber is a natural fiber.

9. A protective article or garment comprising the flame resistant fabric of claim 6.

10. The fabric of claim 1 wherein the polypyridobisimidazole fiber has an inherent viscosity of greater than 25 dl/g.

11. The fabric of claim 1 wherein the polypyridobisimidazole fiber has an inherent viscosity of greater than 28 dl/g.

12. The fabric of claim 1 where the polypyridobisimidazole fiber is poly[2,6-diimidazo[4,5-b:4,5-e]-pyridinylene-1,4(2,5-dihydroxy)phenylene) fiber.

13. The fabric of claim 1 in the form of a woven fabric.

14. The fabric of claim 1 in the form of a nonwoven fabric.

15. A method of producing a fabric comprising weaving staple fiber yarns comprising an intimate blend of:
   55 to 95 parts by weight of a polypyridobisimidazole fiber having an inherent viscosity of greater than 20 dl/g and a tensile modulus of greater than 120 GPa (820 gpd); and
   5 to 45 parts by weight of a flexible fiber having a tensile modulus of less than 10 GPa (70 gpd).

16. The method of claim 15 where the polypyridobisimidazole fiber is present at 60 to 80 parts by weight.

17. The method of claim 15 wherein the polypyridobisimidazole fiber is poly[2,6-diimidazo[4,5-b:4,5-e]-pyridinylene-1,4(2,5-dihydroxy)phenylene) fiber.

18. A method of producing a fabric comprising forming from an intimate staple fiber blend of:
   55 to 95 parts by weight of a polypyridobisimidazole fiber having an inherent viscosity of greater than 20 dl/g and a tensile modulus of greater than 120 GPa (820 gpd); and
   5 to 45 parts by weight of a flexible fiber having a tensile modulus of less than 10 GPa (70 gpd).

19. The method of claim 17 where the polypyridobisimidazole fiber is present at 60 to 80 parts by weight.

20. The method of claim 17 wherein the polypyridobisimidazole fiber is poly[2,6-diimidazo[4,5-b:4,5-e]-pyridinylene-1,4(2,5-dihydroxy)phenylene) fiber.

* * * * *